(12) United States Patent
Sareen et al.

(10) Patent No.: US 7,680,789 B2
(45) Date of Patent: Mar. 16, 2010

(54) INDEXING AND SEARCHING NUMERIC RANGES

(75) Inventors: Gaurav Sareen, Bellevue, WA (US); Michael A. Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 11/334,302

(22) Filed: Jan. 18, 2006

(65) Prior Publication Data

US 2007/0174238 A1 Jul. 26, 2007

(51) Int. Cl.
*G06F 7/00* (2006.01)
*G06F 17/30* (2006.01)

(52) U.S. Cl. ......................................................... 707/6
(58) Field of Classification Search ........................ None
See application file for complete search history.

(56) References Cited

U.S. PATENT DOCUMENTS

| | | | | |
|---|---|---|---|---|
| 1,685,206 A * | 9/1928 | Wagner | ........................ | 40/384 |
| 5,613,110 A * | 3/1997 | Stuart | ............................. | 707/1 |
| 5,745,894 A | 4/1998 | Burrows et al. | ................. | 707/5 |
| 5,915,251 A | 6/1999 | Burrows et al. | ............. | 707/102 |
| 5,926,820 A | 7/1999 | Agrawal et al. | ............. | 707/200 |
| 5,974,455 A | 10/1999 | Monier | ....................... | 709/223 |
| 6,421,662 B1 | 7/2002 | Karten | ........................... | 707/3 |
| 7,299,224 B2 * | 11/2007 | Doerre et al. | ................... | 707/4 |
| 2003/0225779 A1 * | 12/2003 | Matsuda | ...................... | 707/102 |

* cited by examiner

*Primary Examiner*—Pierre M Vital
*Assistant Examiner*—Jason Liao
(74) *Attorney, Agent, or Firm*—Woodcock Washburn LLP

(57) ABSTRACT

Index entries representing ranges of values are queried with a query value to determine if the query value is in one of the ranges. Numeric ranges are represented in an index and queries are constructed to match index entries. Search terms are constructed from the query value, such that a search term matches an index entry if and only if the queried for valued is in the range represented by the index entry. To facilitate querying the indexes, queries are constructed to contain search terms having a data structure format similar to that of the index entries.

14 Claims, 11 Drawing Sheets

Range [5, 71] → [00000101, 01000111]

| | | |
|---|---|---|
| 1st | R_00000101 | [5, 5] |
| 2nd | R_0000011X | [6, 7] |
| 3rd | R_00001XXX | [8, 15] |
| 4th | R_0001XXXX | [16, 31] |
| 5th | R_001XXXXX | [32, 63] |
| 6th | R_01000XXX | [64, 71] |

FIGURE 2

Query Value = 50 → [00110010]

| | |
|---|---|
| R_XXXXXXXX | 1 |
| R_0XXXXXXX | 2 |
| R_00XXXXXX | 3 |
| R_001XXXXX | 4 |
| R_0011XXXX | 5 |
| R_00110XXX | 6 |
| R_001100XX | 7 |
| R_0011001X | 8 |
| R_00110010 | 9 |

INDEXING AND SEARCHING NUMERIC RANGES

TECHNICAL FIELD

The technical field generally relates to indexes and more specifically to querying indexes comprising entries indicative of numeric ranges.

BACKGROUND

Search systems, such as search engines, search large numbers of databases, web pages, documents, etc. A common goal of many search systems is to provide quick and meaningful responses to queries. In an attempt achieve efficient searches, many search engines utilize indexes to facilitate searching. An index maps content (typically in the form of tokens) to the entities being searched (database records, web pages, or the like). Typically, an index is queried for an exact match to a query value. Or, a range query is submitted looking for all documents which contain a value in the range query. Current systems however, do not provide an efficient mechanism for querying with a probe value in search of documents containing a range of values, wherein the probe value is within the range.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

Numeric ranges are represented in an index and queries are constructed to match index entries. A data structure for an index entry representing a numeric range includes a portion indicating that the index entry represents a range of values. Other portions of the index entry data structure represent the starting value and the ending value of the range. Search terms are constructed from the query value. Search terms are constructed to match the index entries if and only if the queried for value is in a range represented by an index entry. In an exemplary embodiment, the first portion of an index entry indicative of a range of values includes a predetermined header. The header indicates that the index entry represents a range of values. The remainder of the data structure of the index entry is formatted to indicate the range of represented values. To facilitate querying the indexes, queries are constructed to contain search terms having a data structure format similar to that of the index entries.

BRIEF DESCRIPTION OF THE DRAWINGS

The foregoing summary, as well as the following detailed description, is better understood when read in conjunction with the appended drawings. For the purpose of illustrating indexing and searching numeric ranges, there is shown in the drawings exemplary constructions thereof, however, indexing and searching numeric ranges is not limited to the specific methods and instrumentalities disclosed. In the drawings:

FIG. 2 is a diagram of an exemplary portion of an index containing several index entries representing a range of values;

FIG. 3 illustrates exemplary search terms for a query value;

DETAILED DESCRIPTION OF ILLUSTRATIVE EMBODIMENTS

Figure 1:
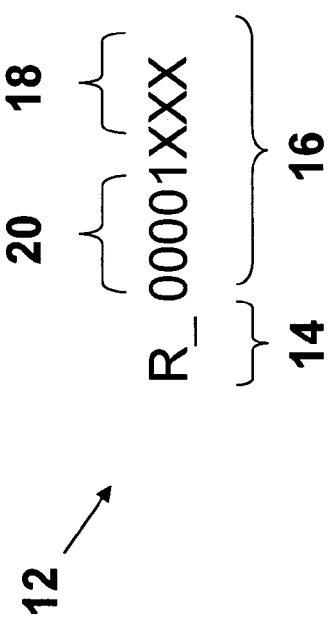
FIG. 1 is an illustration of an exemplary data structure for an index entry representing a range of numeric value;.

FIG. 1 is an exemplary data structure for an index entry 12 representing a range of numeric values. Index entry 12 comprises an indicator portion 14 indicating that index entry 12 represents a range of numeric values. Indicator portion 14 contains the letter "R" followed by an underscore, i.e., "R_". It is to be understood that this header is exemplary and that any appropriate header indicating that the index entry is indicative of a range of value is applicable. As depicted in FIG. 1, indicator portion 14 is placed at the beginning (header) of index entry 12. Portion 14 can be placed at any appropriate location, or locations, in the index entry 12, such as at the beginning (e.g., header), at the end (e.g., tail), someplace in between, or a combination thereof for example.

Index entry 12 also contains a range portion 16 indicative of the range of numeric values represented by index entry 12. Range portion 16 is indicative of the starting value of the range and the ending value of the range. Range portion 16 comprises a variable portion 18 and a non-variable, predetermined (fixed) portion 20. As depicted in FIG. 1, variable portion 18 comprises "don't cares," represented by the letter "X" in each digit position. A "don't care" in a digit position indicates that any digit can be placed in a respective position. For example, assuming that index entry 12 is a binary value, any combination of Is and Os can be placed in the digit locations of variable portion 18. If index entry 12 were a based 10 value, any combination of the numerals 0 through 9 could be placed in the digit locations of variable portion 18.

The range of values represented by index entry 12 is determined by determining the minimum and maximum values of range portion 16. The minimum value of range portion 16 is determined by placing the minimum possible digit values in variable portion 18 and evaluating the resultant value of range portion 16. The maximum value of range portion 16 is determined by placing the maximum possible digit values in variable portion 18 and evaluating the resultant value of range portion 16. For example, if index entry 12 is a binary value, the minimum value of range portion 16 is "00001000" and the maximum value of range portion 16 is "00001111." Converting these binary values to base 10 values results in the minimum value being 8 and the maximum value being 15. It is to be understood that any appropriate base can be used. For example, if index entry 12 is a base 10 value, the minimum value is "00001000" and the maximum value is "00001999."

In accordance with an exemplary embodiment, an index is populated with index entries indicative of a range of numeric values. Each index entry is indicative of at least a portion of the total range of numeric values represented. In and exemplary embodiment, index entries are formatted such that all values within the total range are represented by the minimum number of words. In other exemplary embodiments, more than a minimum number of words can be utilized. As described below, each prefix specifies an associated minimum and maximum value. When encoding a particular numeric value at index generation time, all the prefixes that value falls in are calculated and stored. This encodes enough information such that at query time prefixes can be generated corresponding to the range and it can be determined if there is a match in the encoded values.

In an exemplary embodiment, an index is populated with as many index entries as needed to cover a range of numerical values. FIG. 2 is a diagram of an exemplary portion of an index containing several index entries representing a range of values. As depicted in FIG. 2, index entries are represented as binary values in column 22. The equivalent base 10 values are depicted in column 24. The range to be covered is 5 through 71 (base 10). Converting this range to 8-bit binary values results in "00001101" through "01000111." The index portion depicted in FIG. 2 comprises 6 entries. The 1$^{st}$ index entry is "R_00000101" which is the value 5 (base 10). This is the lower limit of the range of numerical values. Because the range of numerical values includes all values (e.g., integers) from 5 through 71, the next (2$^{nd}$) index entry includes the value 6 (the next integer after 5). The 2$^{nd}$ index entry is "R_0000011X." Evaluated at its minimum value, the 2$^{nd}$ entry is 6, and evaluated at its maximum value the 2$^{nd}$ entry is 7. Thus, the 2$^{nd}$ index entry is indicative of the values 6 through 7. The next (3$^{rd}$) index entry includes the value 8 (next integer after 7). The 3$^{rd}$ index entry is "R_00001XXX." The 3$^{rd}$ index entry evaluated at its minimum value is 8 and evaluated at its maximum value is 15. This pattern continues until the maximum value of the range, 71 in this case, is covered by an index entry. The 6$^{th}$ index entry is "R_01000XXX." The 6$^{th}$ index entry evaluated at its minimum value is 64 and evaluated at its maximum value is 71. Although, the values depicted in FIG. 2 are integers, application of indexing and searching numeric ranges is not limited thereto. For example, floating point values can be represented.

To query an index comprising index entries indicative of a range of numeric values, a query is formatted into search terms having a data structure similar to the index entry data structure. FIG. 3 illustrates exemplary search terms for the query value 50. As depicted in FIG. 3, the query value is 50 (base 10), which is "00110010" (base 2). Each search term comprises an indicator portion, depicted as "R_K" in FIG. 3. In an exemplary embodiment, the indicator portion is compatible with the indicator portion of the index entries (e.g., indicator portion 14 of FIG. 1) to be searched. This is not necessary however, because the indicator portion could be removed before conducting a query. Each search term also comprises a range portion analogous to the range portion of the index entries (e.g., range portion 16 of FIG. 1).

Enough search terms are created to ensure that all documents containing the query value are found. In an exemplary embodiment, the number of search terms created depends upon the number of digit positions in the index entries. As shown in FIG. 2, index entries are represented by 8-bit binary values. Thus, there are 8 digit positions. The number of search terms created is equal to the number of digit positions plus one. Thus, as shown in FIG. 3, nine search terms are created (see column 26). The resulting series of search terms is compared with the index entries to perform a query. Search terms are formatted to facilitate comparison with index entries. The search terms of FIG. 3 are formatted as 8-bit binary values to facilitate comparison with the index entries of FIG. 2.

Figure 4:
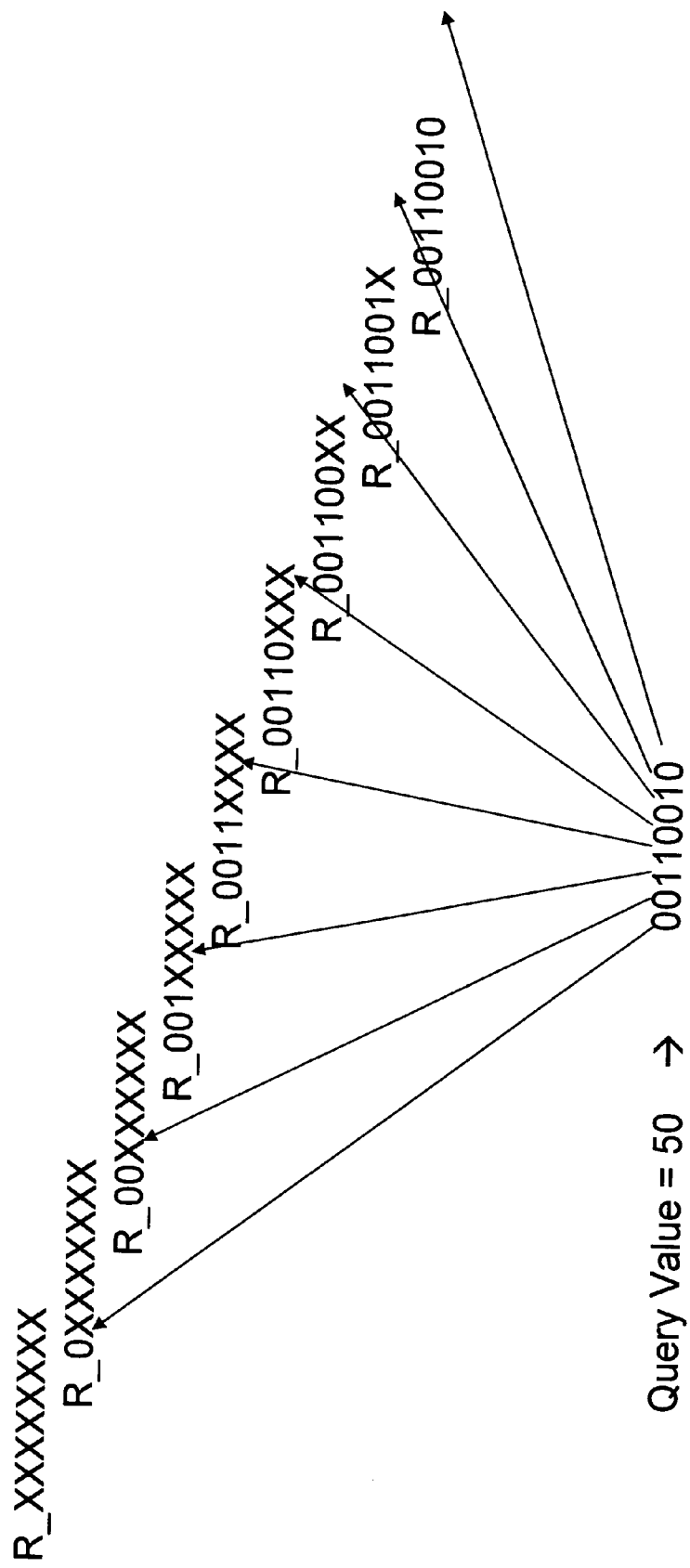
FIG. 4 illustrates an exemplary creation of search terms.

FIG. 4 illustrates an exemplary creation of search terms. The same search terms are depicted in FIG. 3 and FIG. 4. In an exemplary embodiment, a first search terms is created by placing a "don't care" in each digit position. Subsequent search terms replace a "don't care" with the corresponding digit value of the query value. This replacement procedure is continued until the query value is created. For example, referring to FIG. 3 and FIG. 4, the first search term is "R_XXXXXXXX." This search term was created by placing a "don't care" in each digit position. The next search term (search term number 2) is "R_0XXXXXXX." This search term was created by replacing the "don't care" in the most significant digit position of the search term with the digit value from the most significant digit position of the query value. This procedure is repeated for each digit position until the don't cares have been replaced with the appropriated values from the query value.

Figure 5:
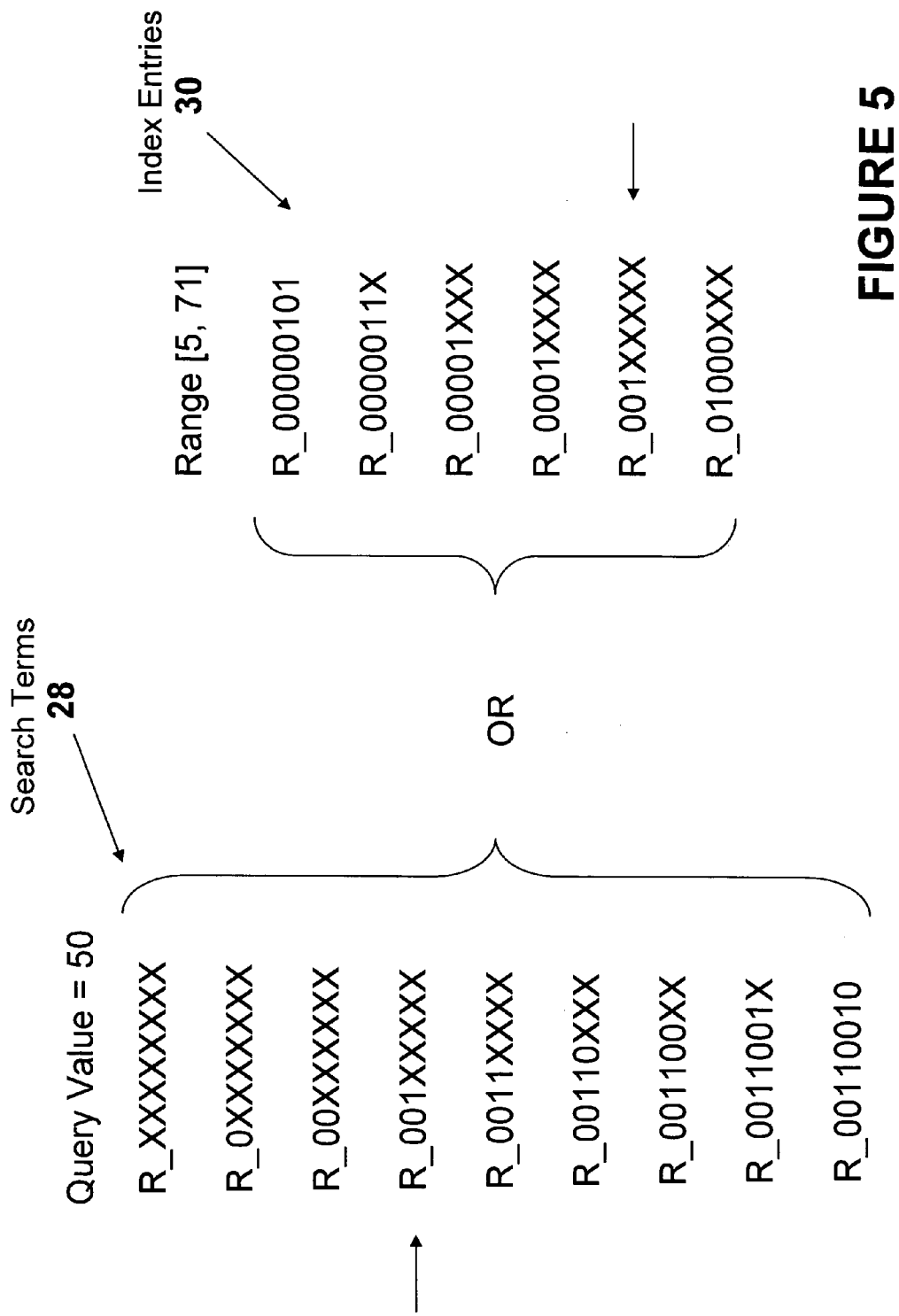
FIG. 5 is an exemplary illustration of querying index entries with formatted search terms.

FIG. 5 is an exemplary illustration of querying index entries with formatted search terms. The search terms 28 are compared with index entries 30. In an exemplary embodiment, each search term is logical OR'd with each index entry. If a search term and an index entry are the same, the query value is in the range of values represented by the matching index entry. As shown by horizontal arrows in FIG. 5, the search term "R_001XXX" is the same as the index entry "R_001XXXXX." Thus query value 50 is in the range (32 through 63 base 10) represented by the matching index entry.

Figure 6:
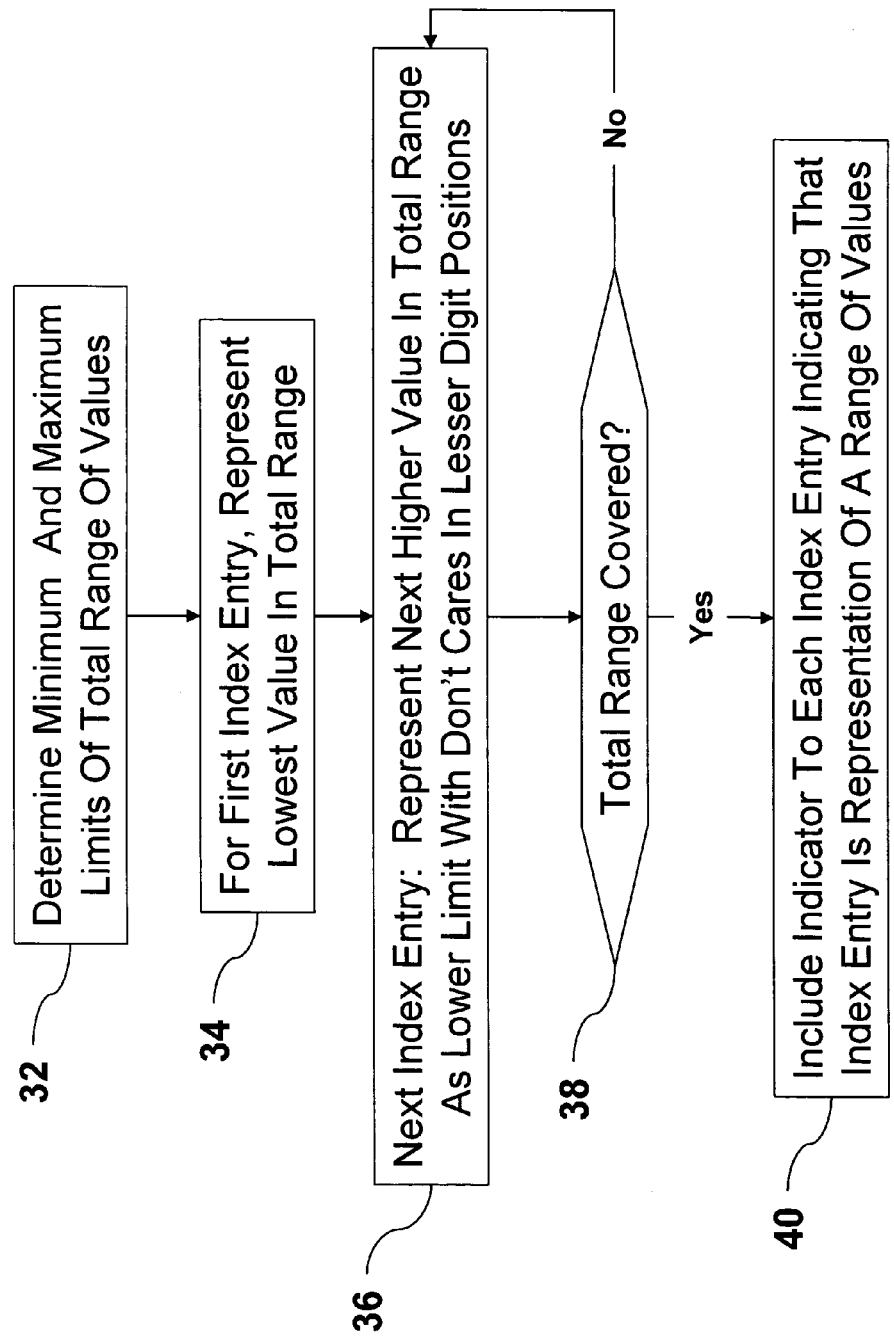
FIG. 6 is a flow diagram of an exemplary process for creating index entries indicative of a range of numeric values.

FIG. 6 is a flow diagram of an exemplary process for creating index entries indicative of a range of numeric values. The minimum and maximum limits of the total range of numeric values to be represented by the index entries are determined at step 32. This is analogous to the minimum and maximum limits of 5 and 71 with reference to FIG. 2. A first index entry representing the minimum numeric value of the total range is created at step 34. At step 36, a subsequent index entry is created by representing the next higher value (with respect to the previous index entry) of the total range of values as the minimum value of the index entry and placing don't cares in all lesser digit positions. For example, see the second index entry depicted in FIG. 2. At step 38, it is determined if the total range of values has been covered by the index entries. If not, the process proceeds to step 36 to create a next index entry. Steps 36 and 38 are repeated until the total range of numeric values is covered by the index entries. Values represented by an index entry differ from values represented by any other index entry. An indicator indicating that an index entry is indicative of a range of number values is included in each index entry at step 40. For example, referring to FIG. 2, the indicator "R_" is included in each index entry.

Figure 7:
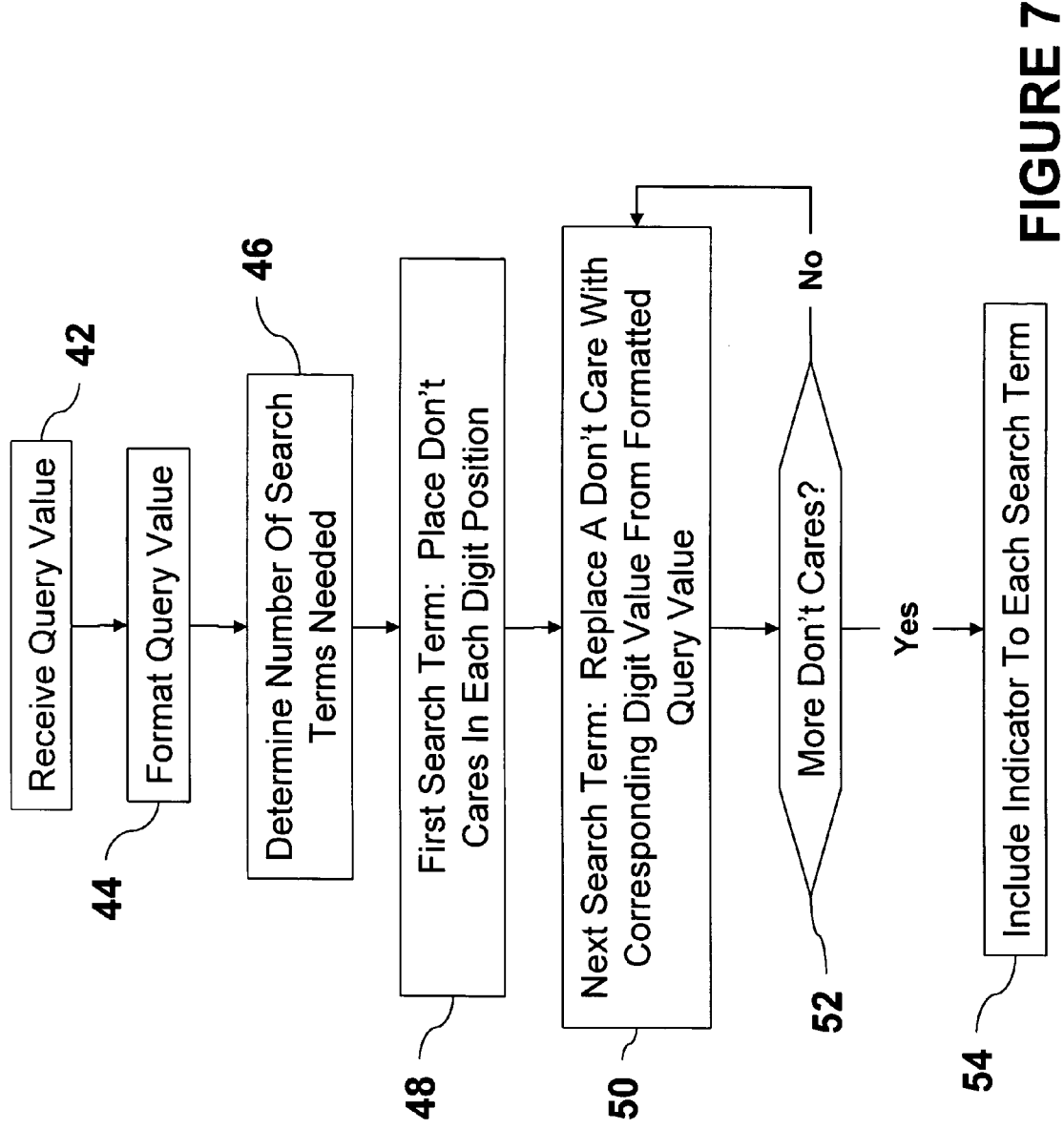
FIG. 7 is a flow diagram of an exemplary process for creating search terms from a query value.

FIG. 7 is a flow diagram of an exemplary process for creating search terms from a query value. A query value is received at step 42. The query value is formatted at step 44. The query value can be formatted in any appropriate manner. In an exemplary embodiment, a query value is formatted as a binary value from a decimal value. For example, referring to FIG. 3, the decimal value 50 is formatted as the binary value 00110010. The number of search terms needed is determined at step 46. In an exemplary embodiment, the number of search terms is equal to the number of digit positions plus one. For example, if the query value is converted (formatted) to an 8-bit binary value, the number of search terms is equal to 8+1=9.

A first search term is created at step 48. This search term is created by placing don't cares in each digit position of the formatted query value. For example, as depicted in FIG. 3, a first search term, R_XXXXXXXX, is created by placing a don't care (represented by the letter "X" in FIG. 3) in each of the 8 digit positions of the formatted query value. It is to be understood that a search terms (as well as index entries) are referred to a first, second, etc. for convenience. Search terms and index entries can be created in any appropriate order.

A subsequent search term is created at step 50. This next search term is created by replacing one of the don't cares from the previous search term with the corresponding value of the formatted query value. Thus, the previously created search term is replicated and one of the don't cares is replaced with the digit value from the corresponding digit position of the formatted query value. (This is illustrated in FIG. 4.) If it is determined (step 52) that more search terms are to be created, the process proceeds to step 50 and repeats until all search terms are created. In an exemplary embodiment, the currently created search term is analyzed to determine if it contains any don't cares. If not, all search terms have been created. If so, more search terms are created. An indicator is included in each search term at step 54. In an exemplary embodiment, the same, or a similar, indicator is included in each search term as was included in each index entry (e.g., "R_").

Figure 8:
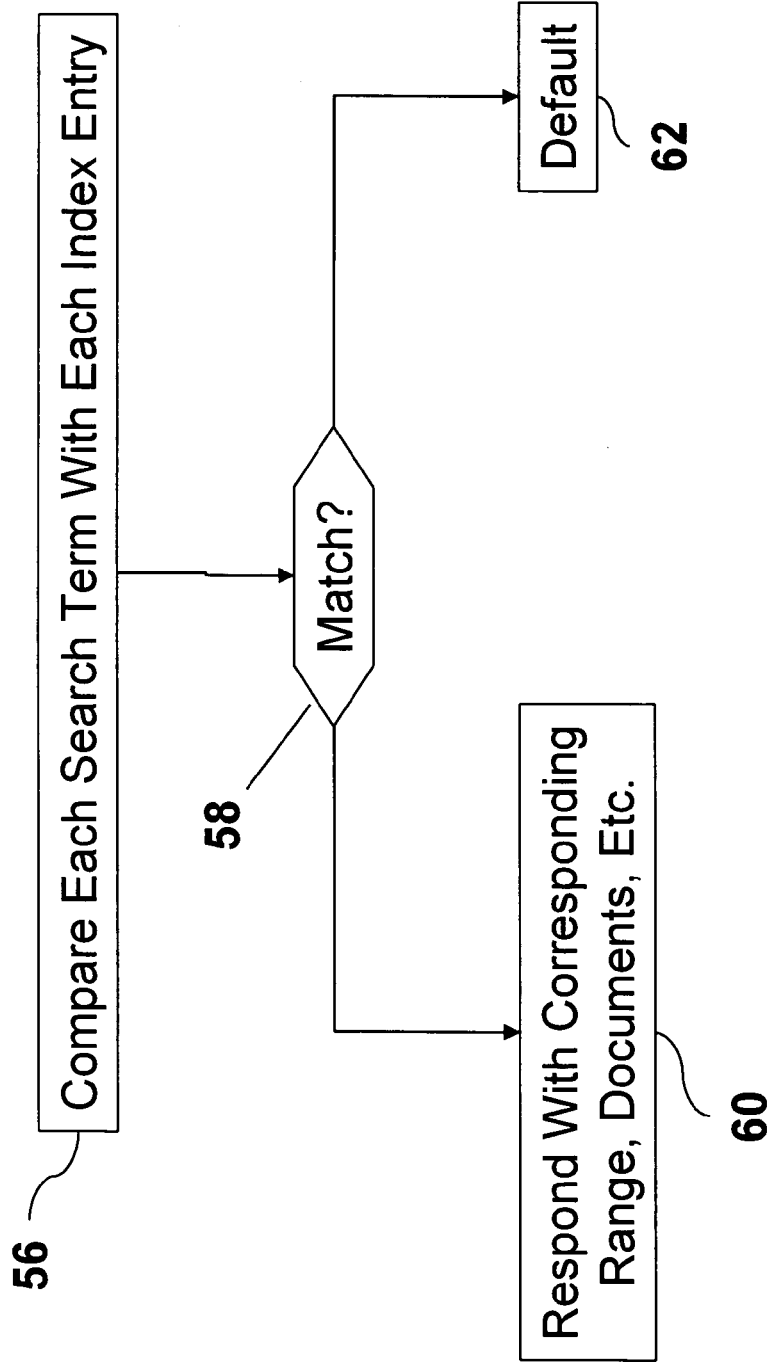
FIG. 8 is a flow diagram of an exemplary process for querying index entries representing a range of numeric values.

FIG. 8 is a flow diagram of an exemplary process for querying index entries representing a range of numeric values. Each search term is compared with each index entry at step 56. In an exemplary embodiment, each search term is logically OR'd with each index entry. If there is a match (step 58), the appropriate response is given at step 60. An appropriate response can be the range of numeric values, documents corresponding to the range of values, or a combination thereof for example. If there is no match (step 58), a default response can be given at step 62. The default response is optional. Any appropriate default response can be provided such as an indication that the queried for information was not found, for example.

Figure 9:
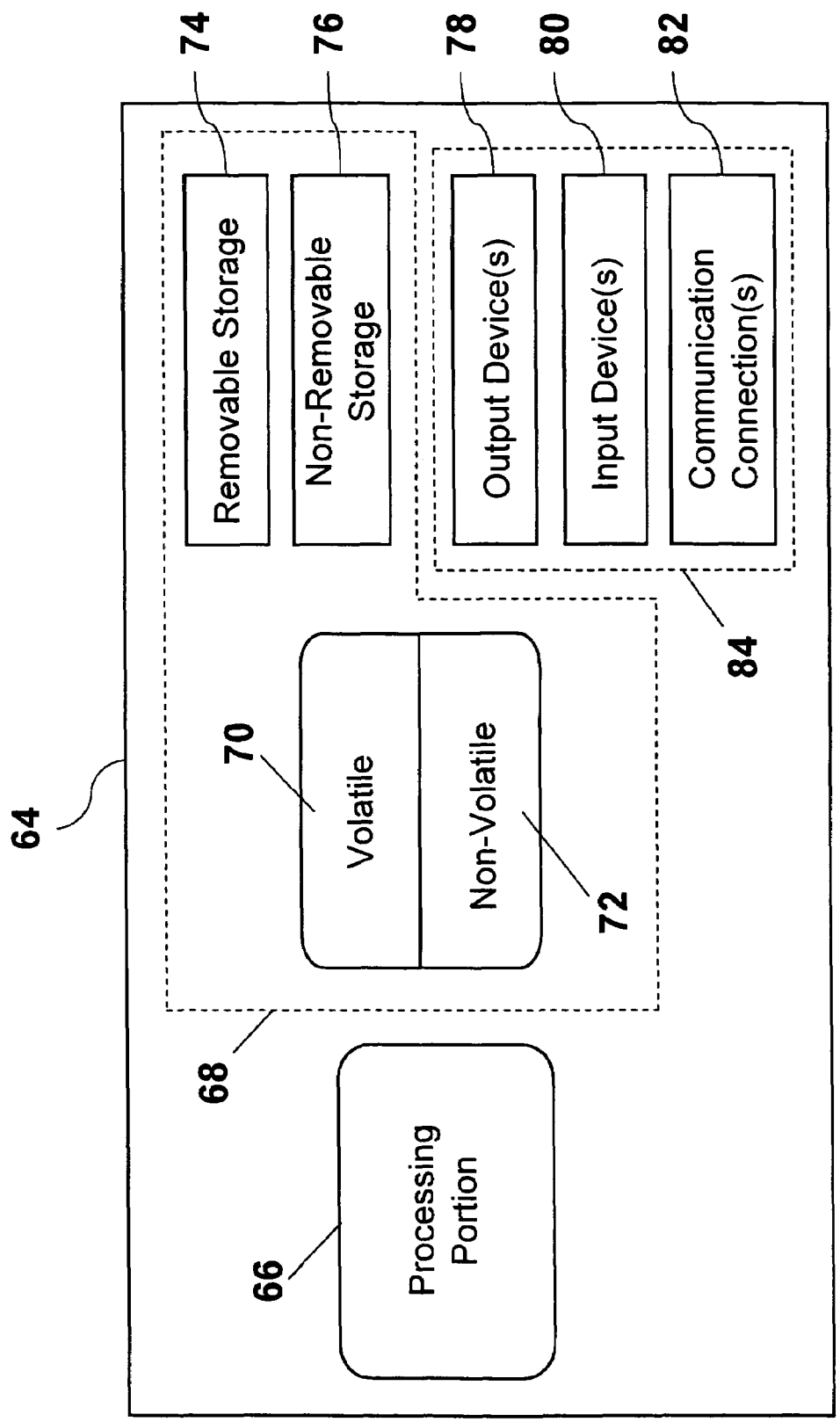
FIG. 9 is a diagram of an exemplary computing device for indexing and searching numeric ranges.

FIG. 9 is a diagram of an exemplary computing device for indexing and searching numeric ranges. The computing device 64 comprises a processing portion 66, a memory portion 68, and an input/output portion 84. The processing portion 66, memory portion 68, and input/output portion 84 are coupled together (coupling not shown in FIG. 1) to allow communications therebetween. The processing portion 66 is capable of constructing index entries indicative of numeric ranges. The processing portion 66 also is capable of receiving queries, via the input/output portion 84. The processing portion 66 is capable of constructing search terms in accordance with a received query value (values) and querying index entries indicative of a range of numeric values with the constructed search terms. In another exemplary embodiment, the computing device 64 is capable of receiving and processing queries containing the formatted search terms. The memory portion 68 is capable of storing all parameters described above.

The computing device 64 can be implemented as a client processor and/or a server processor. In a basic configuration, the computing device 64 can include at least one processing portion 66 and memory portion 68. Depending upon the exact configuration and type of computing device, the memory portion 68 can be volatile (such as RAM) 70, non-volatile (such as ROM, flash memory, etc.) 72, or a combination thereof. The computing device 64 can have additional features/functionality. For example, the computing device 64 can include additional storage (removable 74 and/or non-removable 76) including, but not limited to, magnetic or optical disks, tape, flash, or a combination thereof. Computer storage media, such as memory portion 68, 70, 72, 74, and 76, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 64. Any such computer storage media can be part of the computing device 64.

The computing device 64 can also contain communications connection(s) 82 that allow the computing device 64 to communicate with other devices. Communications connection(s) 82 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The computing device 64 also can have input device(s) 80 such as keyboard, mouse, pen, voice input device, touch input device, etc. Output device(s) 78 such as a display, speakers, printer, etc. also can be included.

Figure 10:
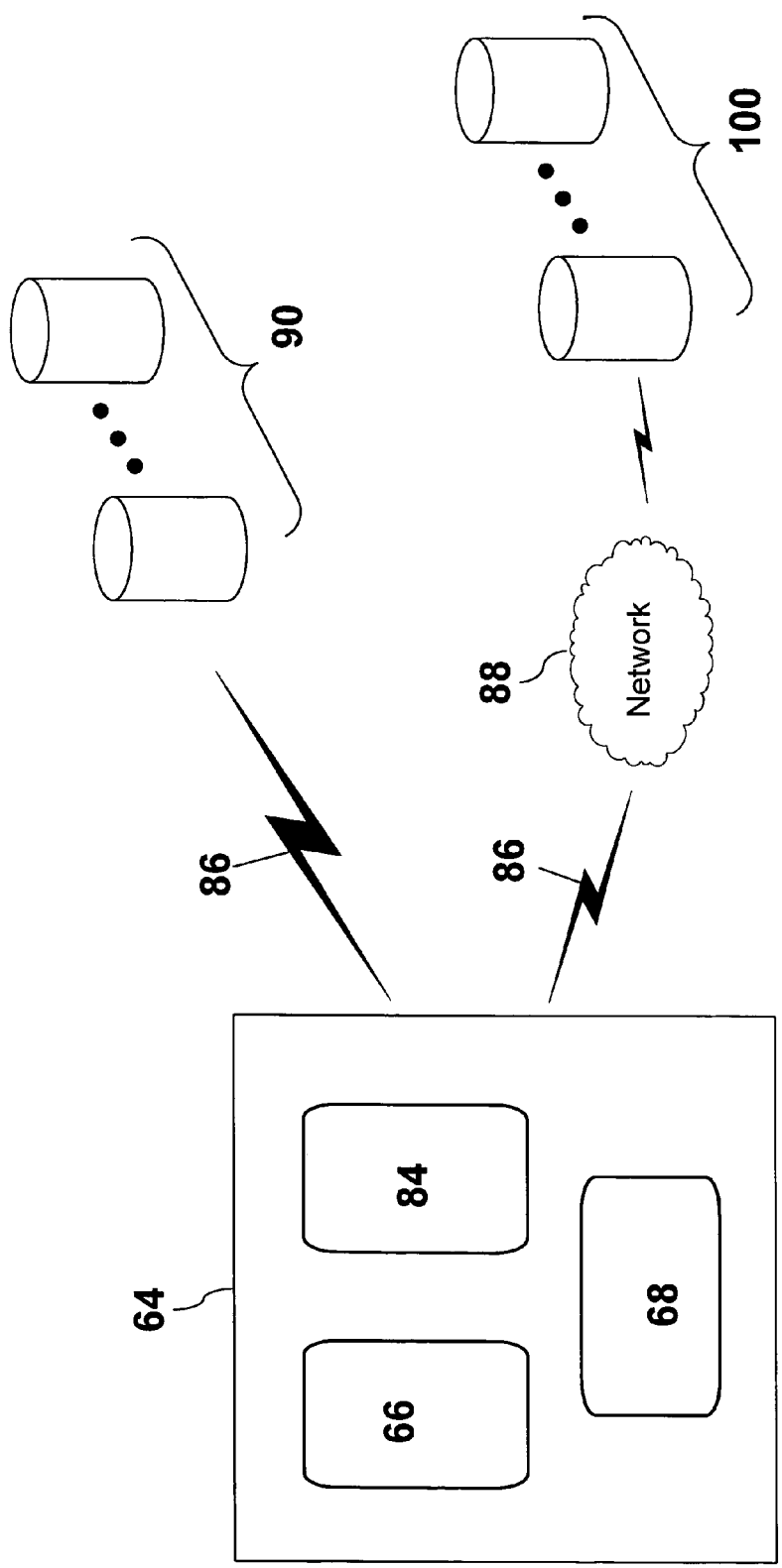
FIG. 10 is a diagram of an exemplary system for indexing and searching numeric ranges.

FIG. 10 is a diagram of an exemplary system for indexing and searching numeric ranges. Computing device 64 can communicate, via input/output portion 84 with other devices via interface 86 and/or network 88. Network 88 is coupled to the computing device 64 via interface 86. The interface 86 can comprise a wireless interface, a hard-wired interface, or a combination thereof. The network 88 represents any of a wide variety of data communications networks. The network 88 can include public portions (e.g., the Internet) as well as private portions (e.g., a residential Local Area Network (LAN)), or a combination thereof. The network 88 can be implemented using any one or more of a wide variety of conventional communications media including both wired and wireless media. Any of a wide variety of communications protocols can be used to communicate data via the network 88, including both public and proprietary protocols. Examples protocols include TCPIIP, IPXI SPX, and Net-BEUI.

Computing device 64 can be coupled to any of a variety of entities via interface 86 and/or network 88. For example, the computing device 64 can be coupled to at least one storage facility. As depicted in FIG. 10, computing device 64 is coupled to storage device 90 via interface 86 and storage device 100 via interface 86 and network 88. These couplings are optional. That is, the computing device 64 can be coupled to storage device 90 via interface 86, or storage device 100 via interface 86 and network 88, or a combination thereof. In an exemplary embodiment, storage device 90 and storage device 100 are the same entity. In another exemplary embodiment, computing device 64 is connected to neither storage device 90 nor storage device 100. Storage devices (90, 100) can comprise a server processor, a client processor, a database, or a combination thereof. Storage devices (90, 100) can comprise any combination of servers, processor, databases, or the like for storing documents and web pages, or the like for querying via index entries representing a range of numeric values.

Figure 11:
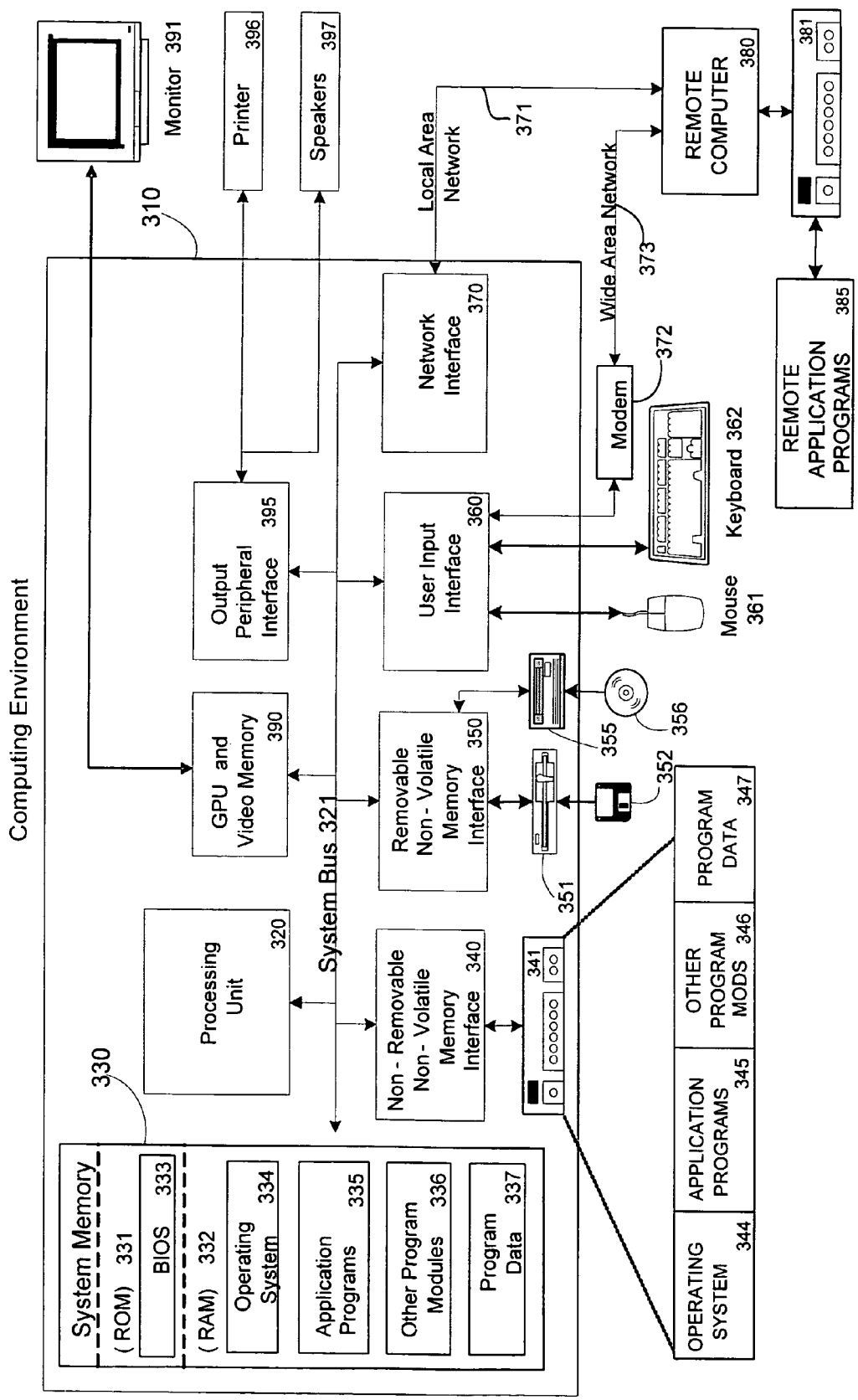
FIG. 11 an exemplary system and operating environment for indexing and searching numeric ranges.

With reference to FIG. 11, an exemplary system and operating environment for indexing and searching numeric ranges includes a general purpose computing device in the form of a computer 310. In an exemplary embodiment, the computer 310 is analogous to the computing device 64 of FIG. 9. Components of the computer 310 can include, but are not limited to, a processing unit 320, a system memory 330, and a system bus 321 that couples various system components including the system memory to the processing unit 320. The system bus 321 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 310 can include a memory cache 322. The processing unit 320 can access data from the memory cache 322 more quickly than from the system memory 330. The memory cache 322 typically stores the data most recently accessed from the system memory 330 or most recently processed by the processing unit 320. The processing unit 320, prior to retrieving data from the system memory 330, can check if that data is currently stored in the memory cache 322. If so, a "cache hit" results and the data is retrieved from the memory cache 322 rather than from the generally slower system memory 330.

The computer 310 typically includes a variety of computer readable media. Computer readable media can be any available media that can be accessed by the computer 310 and includes both volatile and nonvolatile media, and removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 310. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 11 illustrates operating system 334, application programs 335, other program modules 336 and program data 337. In an exemplary embodiment, applications programs 335 comprise a search engine and means for indexing and searching numeric ranges.

The computer 310 can also include other removable/non-removable, volatile/nonvolatile computer storage media. By way of example only, FIG. 11 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, discussed above and illustrated in FIG. 11, provide storage of computer readable instructions, data structures, program modules and other data for the computer 310. In FIG. 11, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers hereto illustrate that, at a minimum, they are different copies. Thus, in an exemplary embodiment, application programs 335 can comprise a programs for indexing and searching numeric ranges. A user can enter commands and information into the computer 310 through input devices such as a tablet, or electronic digitizer, a microphone, a keyboard 362, and pointing device 361, commonly referred to as a mouse, trackball or touch pad. Other input devices (not shown) can include a joystick, game pad, satellite dish, scanner, or the like. These and other input devices are often connected to the processing unit 320 through a user input interface 360 that is coupled to the system bus, but can be connected by other interface and bus structures, such as a parallel port, game port or a universal serial bus (USB). A monitor 391 or other type of display device is also connected to the system bus 321 via an interface, such as a video interface 390. The monitor 391 can also be integrated with a touch-screen panel or the like. Note that the monitor and/or touch screen panel can be physically coupled to a housing in which the computing device 310 is incorporated, such as in a tablet-type personal computer. In addition, computers such as the computing device 310 can also include other peripheral output devices such as speakers 397 and printer 396, which can be connected through an output peripheral interface 395 or the like.

The computer 310 can operate in a networked environment using logical connections to one or more remote computers, such as a remote computer 380. The remote computer 380 can be a personal computer, a server, a router, a network PC, a peer device or other common network node, and typically includes many or all of the elements described above relative to the computer 310, although only a memory storage device 381 has been illustrated in FIG. 11. The logical connections depicted in FIG. 11 include a local area network (LAN) 371 and a wide area network (WAN) 373, but can also include other networks. Such networking environments are commonplace in offices, enterprise-wide computer networks, intranets and the Internet. For example, the computer 310 can comprise the source machine from which data is being migrated, and the remote computer 380 can comprise the destination machine. Note however that source and destination machines need not be connected by a network or any other means, but instead, data can be migrated via any media capable of being written by the source platform and read by the destination platform or platforms.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which can be internal or external, can be connected to the system bus 321 via the user input interface 360 or other appropriate mechanism. In a networked environment, program modules depicted relative to the computer 310, or portions thereof, can be stored in the remote memory storage device. By way of example, and not limitation, FIG. 11 illustrates remote application programs 385 as residing on memory device 381. In an exemplary embodiment, remote application programs 385 comprise software for indexing and searching numeric ranges. It will be appreciated that the network connections shown are exemplary and other means of establishing a communications link between the computers may be used.

The various techniques described herein can be implemented in connection with hardware or software or, where appropriate, with a combination of both. Thus, the methods and apparatuses for indexing and searching numeric ranges or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for indexing and searching numeric ranges. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. The methods and apparatuses for a indexing and searching numerical ranges also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing indexing and searching numerical ranges. When implemented on a general-purpose processor, the program code combines with the processor to provide a unique apparatus that operates to invoke the functionality of indexing and searching numerical ranges. Additionally, any storage techniques used in connection with indexing and searching numerical ranges can invariably be a combination of hardware and software.

While indexing and searching numerical ranges has been described in connection with the exemplary embodiments of the various figures, it is to be understood that other similar embodiments can be used or modifications and additions can be made to the described embodiments for performing the same functions of indexing and searching numerical ranges without deviating therefrom. For example, index entries and search terms can be represented in an appropriate base numbering system, e.g., base 2, base 10, hexadecimal (base 16), to name a few. Index entries and search terms can be represented by any appropriated number of digits. Search terms and index entries can be created in any appropriate order. Further, numeric ranges can represent any appropriate entity or entities, such as documents, database records, web pages, files, links, URLs, or a combination thereof, for example. Therefore, indexing and searching numerical ranges as described herein should not be limited to any single embodiment, but rather should be construed in breadth and scope in accordance with the appended claims.

What is claimed is:

1. A processor-implemented method for searching a range of numeric values, said method comprising:
    providing an index entry data structure comprising:
        a first portion to indicate that said index entry comprises a predetermined minimum value and maximum value that represents a range of numeric values, wherein said minimum value is different than said maximum value; and
        a second portion comprising a non-variable portion having a fixed value and a variable portion comprising said range of numeric values;
    populating, via the processor, an index with a set of index entries comprising the minimum number of index entries necessary to include all index entries within the predetermined range of numerical values, wherein a value representable by the range corresponds to only one entry in the index;
providing a plurality of search terms indicative of a query value;
    comparing, via the processor, each of said index entries with each of said search terms;
    if said act of comparing results in a match between said index entry and a search term, providing, in each index entry, an indication of a respective portion of said range of numeric values associated with said matching index entry;
    formatting said query value, wherein said formatted query value comprises a number of digit positions;
    determining a number of search terms in said plurality of search terms to be equal to one plus said number of formatted query value digit positions;
    constructing a first search term of said plurality of search terms by placing a don't care indicator in each digit position of said first search term, wherein said don't care indicator indicates that any value can be placed at said digit position;

constructing each subsequent search term of said plurality of search terms by:
  replicating a previously constructed search term; and
  replacing a don't care indicator with a digit value in a corresponding digit position of said formatted query value.

2. A method in accordance with claim 1, wherein:
said second part comprises at least one digit position; and
each digit position comprises a don't care indicator, indicating that any value can be placed at said each digit position.

3. A method in accordance with claim 1, wherein:
said second portion comprises a don't care indicator indicative of a minimum value and
further indicative of a maximum value of said range of numeric values.

4. A method in accordance with claim 1, wherein said at least one index entry comprises:
a first index entry indicative of a value of said range of numeric values; and
a subsequent index entry indicative of a remainder of said range of numeric values, wherein values represented by said subsequent index entry differ from values represented by any other subsequent index entry.

5. A method in accordance with claim 1, wherein said range of values is indicative of at least one of a database record, a web page, a document, and a file.

6. A computer-readable storage medium having stored thereon an index entry data structure, comprising:
a first portion indicative of said index entry being indicative of a range of values, wherein the minimum value and maximum value of said range of values are different;
a second portion indicative of said range of values, said second portion comprising:
  a first part indicative of a predetermined value and a second part indicative of a range of values;
a populated index with a set of index entries comprising a minimum number of index entries that includes an entire range of numerical values, in which each index entry provides an indication of a respective portion of said range of values associated with the index entry, wherein a value representable by the range corresponds to only one entry in the index;
a data structure of a formatted query value comprises a number of digit positions, wherein each digit position comprises a digit value;
a data structure of a first search term of said plurality of search terms comprises a don't care indicator in each digit position of said first search term, wherein said don't care indicator indicates that any value can be placed at said digit position; and
a data structure for each subsequent search term of said plurality of search terms comprises:
  a replica of a previously constructed search term with a don't care indicator replaced with a digit value in a corresponding digit position of said formatted query value.

7. A computer-readable storage medium in accordance with claim 6, wherein:
a minimum value of said second portion is indicative of a minimum value of said range of values; and
a maximum value of said second portion is indicative of a maximum value of said range of values.

8. A computer-readable storage medium in accordance with claim 6, wherein:
said second part comprises at least one digit position;
each digit position comprises a don't care indicator, indicating that any value can be placed at said each digit position.

9. A system for indexing a range of numeric values, said system comprising:
a memory portion for:
storing an index entry data structure comprising:
  a first portion to indicate that said index entry comprises a predetermined minimum value and maximum value that represents a range of numeric values, where said minimum value is different than said maximum value; and
  a second portion comprising:
    a non-variable portion having a fixed value and a variable portion comprising said range of numeric values; and
  storing a plurality of search terms indicative of a query value;
a processor portion configured to:
  populate an index with a set of index entries comprising the minimum number of index entries necessary to include all index entries within the predetermined range of numerical values, wherein a value representable by the range corresponds to only one entry in the index;
  compare each of said index entry with each of said search terms; and
  format said query value, wherein said formatted query value comprises a number of digit positions;
  determine a number of search terms in said plurality of search terms to be equal to one plus said number of formatted query value digit positions;
  construct a first search term of said plurality of search terms by placing a don't care indicator in each digit position of said first search term, wherein said don't care indicator indicates that any value can be placed at said digit position; and
  construct each subsequent search term of said plurality of search terms by:
    replicating a previously constructed search term; and
    replacing a don't care indicator with a digit value in a corresponding digit position of said formatted query value
an input/output portion for:
  providing, in each index entry, an indication of a respective portion of said range of numeric values associated with said matching index entry, if said comparison results in a match between said index entry and a search term.

10. A system in accordance with claim 9, wherein:
said second portion comprises at least one digit position;
each digit position comprises a don't care indicator, indicating that any value can be placed at said each digit position.

11. A system in accordance with claim 9, wherein:
said second portion comprises a don't care indicator indicative of a minimum value and
further indicative of a maximum value of said range of numeric values.

12. A system in accordance with claim 9, wherein said at least one index entry comprises:
a first index entry indicative of a value of said range of numeric values; and
a subsequent index entry indicative of a remainder of said range of numeric values, wherein values represented by said subsequent index entry differ from values represented by any other subsequent index entry.

13. A system in accordance with claim 9, wherein said range of values is indicative of at least one of a database record, a web page, a document, and a file.

14. A processor-implemented method for creating a set of numeric index values covering a range of values to be indexed, said method comprising:
- providing an index entry data structure comprising:
  - a first portion to indicate that said index entry comprises a predetermined minimum value and maximum value that represents a range of numeric values, wherein said minimum value is different than said maximum value; and
  - a second portion comprising:
    - a non-variable portion having a fixed value; and
    - a variable portion comprising said range of numeric values;
- populating, via the processor, an index with a set of index entries comprising the minimum number of index entries necessary to include all index entries within the predetermined range of numerical values, wherein a value representable by the range corresponds to only one entry in the index;
- formatting said query value, wherein said formatted query value comprises a number of digit positions;
- determining a number of search terms in said plurality of search terms to be equal to one plus said number of formatted query value digit positions;
- constructing a first search term of said plurality of search terms by placing a don't care indicator in each digit position of said first search term, wherein said don't care indicator indicates that any value can be placed at said digit position;
- constructing each subsequent search term of said plurality of search terms by:
  - replicating a previously constructed search term; and
  - replacing a don't care indicator with a digit value in a corresponding digit position of said formatted query value;
- providing a plurality of search terms indicative of a query value;
- comparing each of said index entries with each of said search terms; and
- if said act of comparing results in a match between said index entry and a search term, providing, in each index entry, an indication of a respective portion of said range of numeric values associated with said matching index entry.

* * * * *

UNITED STATES PATENT AND TRADEMARK OFFICE
CERTIFICATE OF CORRECTION

| | |
|---|---|
| PATENT NO. | : 7,680,789 B2 |
| APPLICATION NO. | : 11/334302 |
| DATED | : March 16, 2010 |
| INVENTOR(S) | : Gaurav Sareen et al. |

It is certified that error appears in the above-identified patent and that said Letters Patent is hereby corrected as shown below:

In column 11, line 8, in Claim 2, delete "part" and insert -- portion --, therefor.

Signed and Sealed this
Nineteenth Day of July, 2011

David J. Kappos
*Director of the United States Patent and Trademark Office*